United States Patent
Foster

(10) Patent No.: US 8,915,991 B2
(45) Date of Patent: Dec. 23, 2014

(54) FLUID SEPARATOR

(71) Applicant: Rolls-Royce PLC, London (GB)

(72) Inventor: Peter Frederick William Foster, Burton on Trent (GB)

(73) Assignee: Rolls-Royce PLC, London (GB)

( * ) Notice: Subject to any disclaimer, the term of this patent is extended or adjusted under 35 U.S.C. 154(b) by 278 days.

(21) Appl. No.: 13/644,989

(22) Filed: Oct. 4, 2012

(65) Prior Publication Data

US 2013/0091860 A1 Apr. 18, 2013

(30) Foreign Application Priority Data

Oct. 13, 2011 (GB) .................................. 1117662.5

(51) Int. Cl.
*B01D 53/24* (2006.01)
*F01D 25/18* (2006.01)
*F01D 25/16* (2006.01)

(52) U.S. Cl.
CPC ............. *F01D 25/18* (2013.01); *F01D 25/16* (2013.01)
USPC .................................. 95/270; 55/404; 55/466

(58) Field of Classification Search
CPC ............................... B01D 53/00; B01D 53/24
USPC ............. 55/400, 404, 405, 406; 95/269, 270
See application file for complete search history.

(56) References Cited

U.S. PATENT DOCUMENTS 7,476,266 B2 * 1/2009 Hallgren et al. ................ 55/406
2008/0078291 A1 4/2008 Daukant

FOREIGN PATENT DOCUMENTS

WO WO 2004/022239 A1 3/2004

OTHER PUBLICATIONS

Jan. 20, 2012 Search Report issued in British Patent Application No. GB1117662.5.

* cited by examiner

*Primary Examiner* — Robert A Hopkins
(74) *Attorney, Agent, or Firm* — Oliff PLC

(57) ABSTRACT

The invention relates to a fluid separator 40 having first and second inlets, a turbine and a separation chamber having a centrifugal separation member. The first inlet is in direct fluid communication with a turbine inlet, and in use delivers high pressure vent air flow from a first gas turbine engine bearing housing to the turbine. The second inlet is in direct fluid communication with the centrifugal separation member, and in use delivers low pressure vent air flow from a second gas turbine engine bearing housing to the centrifugal separation member. An outlet of the turbine is in direct fluid communication with the centrifugal separation member. The centrifugal separation member is driven by the turbine.

14 Claims, 2 Drawing Sheets

FLUID SEPARATOR

The present invention relates to a fluid separator.

Gas turbine engines generally include bearing assemblies to rotatably mount rotatable components such as shafts within the engine. Such bearing assemblies comprise bearing chambers which are partly filled with lubricating oil to lubricate the bearings. The bearing chambers are often vented to ensure that a sufficient inflow of sealing air is achieved to prevent oil from escaping the bearing chambers through the seal and thereby contaminating other parts of the engine. The quantity of vented air is normally limited by orifice type restrictors to ensure the vent flow is not excessive, and exhausted overboard from the engine to ambient air pressure, which is usually the lowest available sink pressure.

As this vent air from the bearing chambers will have entrained oil droplets in the form of a mist it is important to separate out this oil before exhausting the air overboard. This is to minimize the loss of oil from the engine and to minimize the environmental impact of the engine. Separation of the oil droplets from the air oil mist is normally accomplished by a rotating air oil separator that achieves separation by the centrifugal force applied to the oil droplets. The separator is normally driven by a direct mechanical drive from the engine's accessory gearbox, or part of a main shaft.

Such an arrangement adds to the size of the gearbox. Since the separator takes mechanical power from the gearbox, such an arrangement also reduces the overall efficiency of the engine.

US 2008/0078291 describes an alternative air oil separator for use in a gas turbine engine. The air oil separator comprises a turbine rotor disposed in a passage and adapted to be rotated by an air oil mixture flow passing through the passage to separate oil from the mist by centrifugal force.

However the air oil mist from some sources will not provide sufficient energy to drive the turbine rotor at sufficient speed to adequately separate the air oil mist, and so a further separation stage such as an electrostatic separator is required. Such an apparatus therefore takes up additional space within the engine, and adds further weight and complexity, particularly as electrical power must be supplied to the electrostatic separator.

The present invention provides an air oil separator that seeks to address the aforementioned problems.

Accordingly, a first aspect of the present invention provides a fluid separator comprising a turbine and a separation chamber housing a separation arrangement,
the fluid separator having a first inlet which is in direct fluid communication with an inlet to the turbine,
the turbine having an outlet in fluid communication with a first inlet to the separation chamber,
and the fluid separator having a second inlet in direct fluid communication with a second inlet to the separation chamber,
wherein the separation arrangement is configured to be powered by the turbine.

Using such an arrangement, different pressure fluid flows can be provided to the turbine and separation chamber in use. Relatively high pressure fluid can therefore be used to drive the turbine, and relatively low pressure fluid from a different source can bypass the turbine, and be supplied directly to the separation chamber. By using high pressure air to power the turbine, a relatively high pressure drop across the turbine can be provided, which in turn will provide sufficient energy to efficiently operate the separator arrangement. The pressure drop across the turbine also allows the separator arrangement to be used to separate oil from both the high pressure fluid and the low pressure fluid, as pressure at the turbine outlet is sufficiently low to enable low pressure fluid to be vented directly to the second inlet of the separation chamber. A single fluid separator can therefore be used to efficiently separate two or more fluids having different pressures.

The turbine may be configured such that, in use, fluid from the turbine outlet is at the same or a lower pressure than fluid at the second inlet to the separation chamber. The turbine may be configured such that, in use, fluid from the turbine outlet has a flow rate below a predetermined rate.

The separation arrangement may be mechanically driven by the turbine. The separation arrangement may comprise a centrifugal separator. Alternatively, the turbine may drive an electrical generator to provide electrical power to an electric motor, which may in turn power the separation arrangement. Where the turbine drives an electrical generator, the separation arrangement may comprise an electro-static separator.

The first and second separator inlets may be configured to receive fluid from first and second sources respectively. The first and second sources may comprise separate bearing chambers of a gas turbine engine. In use, the vent air from the first bearing chamber may be at a higher pressure than the vent air from the second bearing chamber.

A second aspect of the present invention provides a gas turbine engine comprising an assembly in accordance with the first aspect.

A third aspect of the invention provides a method of using a fluid separator according to the first aspect of the invention to separate a first fluid and a second fluid, the method comprising:
supplying the first fluid and second fluid from a first source to the first separator inlet;
supplying the first fluid and second fluid from a second source to the second separator inlet;
directing the first fluid and second fluid from the first source through the turbine to power the
fluid separation arrangement to thereby separate the first fluid from the second fluid.

An example of the present disclosure will now be described with reference to the accompanying drawings, in which.

Figure 1:
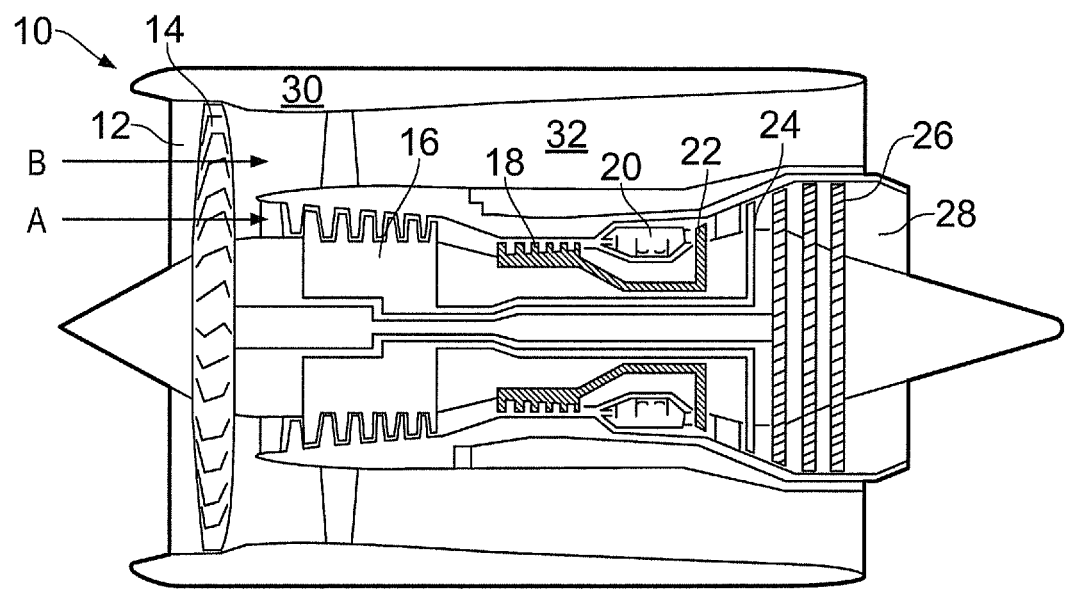
FIG. 1 is a sectional side view of a gas turbine engine.

An example of a gas turbine engine 10 is shown in FIG. 1 and comprises an air intake 12 and a propulsive fan 14 that generates two airflows A and B. The gas turbine engine 10 comprises, in axial flow direction A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow direction B, a bypass duct 32.

Figure 2:
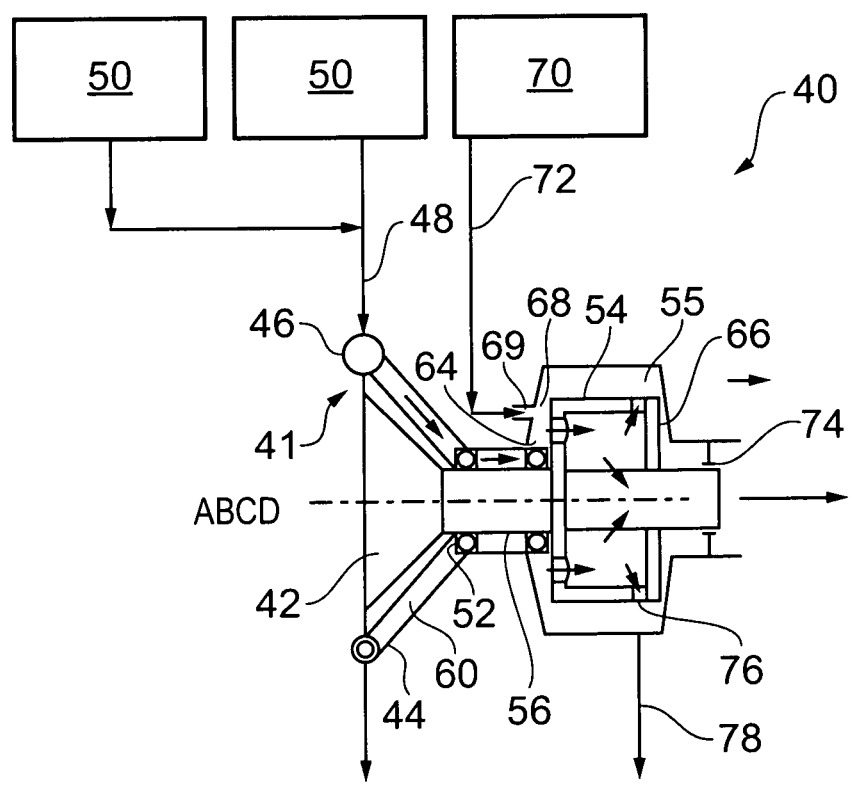
FIG. 2 is a sectional side view of a fluid separator in accordance with the present disclosure.

FIG. 2 shows an example of a fluid separator 40 in accordance with the present invention for installation within the gas turbine engine 10 as described below.

The separator 40 includes a turbine 41 comprising a turbine rotor 42 disposed within a housing 44. The separator 40 includes a first inlet 46 in direct fluid communication with an inlet to the fluid separator turbine 41, and in use is supplied with a first fluid mixture in the form of a relatively high pressure vent air flow 48. The high pressure vent air flow comprises an air-oil mist and is produced from at least one, and in this embodiment two, bearing chambers 50 sealed using high pressure air from the high pressure compressor 18. The fluid separator turbine 41 further includes an outlet 52, and is configured such that the high pressure vent air flow 48 is directed from the first separator inlet 46 to the turbine outlet 52, thereby driving the turbine rotor 42. The fluid separator turbine 41 is arranged to provide a pressure drop across the turbine rotor 42, such that the pressure of the fluid flow at the outlet 52 is less than at the first separator inlet 46. The pressure drop across the turbine 41 will depend upon the mechanical energy required by the air-oil separation arrangement (described below), and the volume of fluid flow. In one example, the pressure drop across the turbine 41 is between 300 and 700 Kilo Pascals (KPa), and preferably about 500 KPa.

When driven by the high pressure vent air flow 48, the rotor 42 directs a portion of the relatively heavy oil entrained in the vent air flow to a circumferential edge of the housing 44, and thus separates a portion of the entrained oil from the high pressure vent air flow 48.

The fluid separator turbine rotor 42 is operably connected to a centrifugal air-oil separation arrangement 54 within a separation chamber 55 by a shaft 56 mounted to the housing 44 by bearings 58. The shaft 56 and the housing 44 define a duct 60, which extends between the turbine outlet 52 and a first separation chamber inlet 64 in direct fluid communication with the separation chamber 55. The centrifugal air-oil separator includes a rotor 66 disposed within the chamber 55 operably connected to the shaft 56 and comprising a plurality of radially extending vanes (not shown).

The separator 40 also includes a second separator inlet 69, which is in direct fluid communication with a second separation chamber inlet 68, and in use is supplied with relatively low pressure vent air 72 from a low pressure bearing chamber 70. The relatively low pressure vent air 72 has the same or a lower pressure than the fluid separator turbine 41 outlet pressure, such that a negative pressure gradient is provided between the bearing chamber 70 and the second separation chamber inlet 68.

When spun by the fluid separator turbine rotor 42, the vanes of the centrifugal separator rotor 66 direct the remaining relatively heavy oil entrained in the mist 48, 72 contained within the centrifugal separation chamber 55 to a circumferential edge of the housing 44, and thus separate the oil from the air. A pressure drop is provided between the first and second separation chamber inlets 64, 69, and a central air outlet 74, such that the cleaned air is directed toward the outlet 74 by the pressure gradient. Again, the pressure drop will depend on the available sink pressure (normally approximately atmospheric pressure) and the volume of cleaned air and entrained oil for example. In general though, the pressure drop across the separator rotor 66 will generally be between 3 KPa and 70 KPa. The cleaned air from the central air outlet 74 is then discharged from the engine from a discharge port (not shown) at generally atmospheric pressure.

Once separated from the air-oil mists by the turbine rotor 42 and separator rotor 66, the relatively heavy oil settles in a sump 76 provided in a lower part of the housing 44. The oil is removed from the sump 76 by an oil scavenge pump (not shown) through one or more oil ducts 78, and returned to the engine oil reservoir.

The invention therefore provides an air-oil separator which is efficient, and provides air-oil separation for vent air flows comprising air-oil mists from sources having different pressures, such as separate bearing chambers in a gas turbine engine. Since the separator does not require an external mechanical drive, it can be located in a more favourable location when installed on an engine, for instance away from locations where the exhaust might stain the cowling. The lack of an external drive also reduces the weight of the arrangement relative to previous arrangements. The rotational speed of the air-oil separation chamber is also independent of the rotational speed of the engine. The oil-air separator can therefore be configured to operate at a higher efficiency at various engine conditions.

The restriction and drop in pressure provided by the turbine also restricts the flow of vent air through the arrangement below a predetermined rate, thereby negating the requirement for a separate orifice type restrictor.

While the invention has been described in conjunction with the exemplary embodiment described above, many equivalent modifications and variations will be apparent to those skilled in the art when given this disclosure. Accordingly, the exemplary embodiments of the invention set forth above are considered to be illustrative and not limiting. Various changes to the described embodiment may be made without departing from the spirit and scope of the invention.

For example, the air-oil separator may be indirectly driven by the turbine. For instance, the turbine may provide mechanical power to an electrical generator, which may provide electrical power to a motor, which may in turn drive the air-oil separator.

Though the separation arrangement described in the first example is a centrifugal separator, other types of separation arrangements may be suitable. For instance, where the turbine provides mechanical power to an electrical generator, the separation arrangement may comprise an electrostatic separator.

Though the separation arrangement described in the first example is described as separating oil from an air—oil mixture, the skilled person would understand that the separation arrangement could also be used to separate a fluid mixture comprising any pair of fluids having different densities, such as an air—water mist, or a water—oil mixture. Furthermore, the term "oil" as used in this specification is intended to cover any fluid suitable for use as a lubricant, and is not necessarily limited to mineral oils.

The invention claimed is:

1. A fluid separator comprising,
a turbine having a turbine rotor arranged to separate a fluid by centrifugal force; and
a separation chamber housing a separation arrangement having a separation rotor arranged to separate a fluid by centrifugal force,
the fluid separator having a first inlet which is in direct fluid communication with an inlet to the turbine,
the turbine having an outlet in fluid communication with a first inlet to the separation chamber, and
the fluid separator having a second inlet in direct fluid communication with a second inlet to the separation chamber,
wherein the separation arrangement is configured to be powered by the turbine, characterised in that the turbine is configured such that, in use, fluid at the second inlet to the separation chamber is at the same or a lower pressure than fluid flow from the turbine outlet.

2. An assembly according to claim 1, in which the separation arrangement is mechanically driven by the turbine.

3. An assembly according to claim 1, in which the separation arrangement comprises a centrifugal separator.

4. An assembly according to claim 1, in which the first and second separator inlets are configured to receive fluid from first and second sources respectively.

5. An assembly according to claim 4, in which the first and second sources are separate bearing chambers of a gas turbine engine.

6. A gas turbine engine comprising a fluid separator according to claim 1.

7. A method of using a fluid separator to separate a first fluid and a second fluid, the method comprising:
supplying the first fluid and the second fluid from a first source to a first inlet of a turbine having a turbine rotor;
supplying the first fluid and second fluid from a second source to a second inlet of a separation chamber housing a separation arrangement having a separation rotor;
directing the first fluid and the second fluid from the first source through the turbine rotor to power the fluid separation arrangement to thereby separate the first fluid from the second fluid; and
directing the first fluid and the second fluid from the second source through the separation rotor to power the fluid separation arrangement to thereby separate the first fluid from the second fluid.

8. A method as claimed in claim 7 wherein the first fluid and the second fluid from the first source are delivered to the fluid separator at a first pressure, and the first fluid and the second fluid from the second source are delivered to the fluid separator at a second pressure, the first pressure being substantially greater than the second pressure.

9. A method as claimed in claim 7, wherein the pressure drop between the first inlet and an outlet of the turbine is at least 300 KPa, and not more than 700 KPa.

10. A method as claimed in claim 9, wherein the pressure drop between the first inlet and the outlet of the turbine is at approximately 500 KPa.

11. A method as claimed in claim 7 wherein the pressure drop across the separation chamber is at least 3Kpa and not more than 70 KPa.

12. A method as claimed in claim 7 wherein one, but not both, of the first and second fluids comprises air.

13. A method as claimed in claim 12 wherein the other fluid comprises a liquid hydrocarbon.

14. A fluid separator comprising:
a turbine; and
a separation chamber housing a separation arrangement,
the fluid separator having a first inlet in direct fluid communication with an inlet to the turbine and configured to receive fluid from a first bearing chamber of a gas turbine engine,
the turbine having an outlet in fluid communication with a first inlet to the separation chamber, and
the fluid separator having a second inlet in direct fluid communication with a second inlet to the separation chamber and configured to receive fluid from a second bearing chamber of the gas turbine engine,
wherein the separation arrangement is configured to be powered by the turbine, characterised in that the turbine is configured such that, in use, fluid at the second inlet to the separation chamber is at the same or a lower pressure than fluid flow from the turbine outlet.

* * * * *